No. 868,187. PATENTED OCT. 15, 1907.
J. F. IVES.
PERCOLATOR.
APPLICATION FILED JAN. 22, 1907.
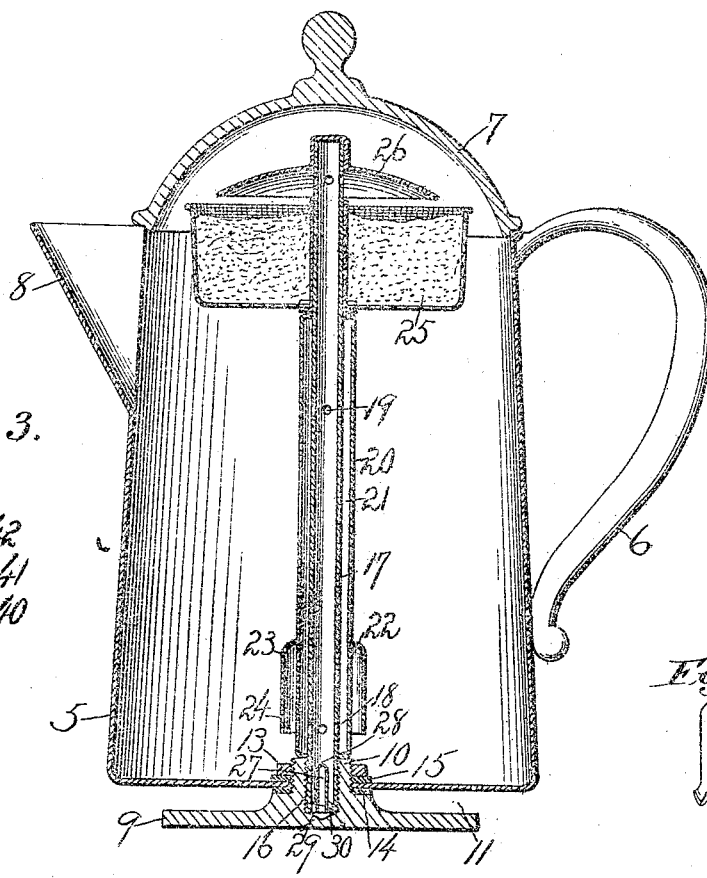
Fig. 1.
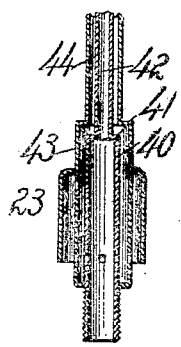
Fig. 3.
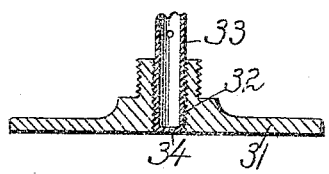
Fig. 2.
Fig. 4.
WITNESSES:
INVENTOR.
John F. Ives,
BY
Arthur B. Jenkins
ATTORNEY.

UNITED STATES PATENT OFFICE.

JOHN F. IVES, OF NEW BRITAIN, CONNECTICUT.

PERCOLATOR.

No. 868,187.      Specification of Letters Patent.      Patented Oct. 15, 1907.

Application filed January 22, 1907. Serial No. 353,468.

*To all whom it may concern:*

Be it known that I, JOHN F. IVES, a citizen of the United States, and a resident of New Britain, in the county of Hartford and State of Connecticut, have invented a new and Improved Percolator, of which the following is a specification.

My invention relates more especially to the class of receptacles used for preparing coffee in liquid form, and more especially to that class of receptacles in which the liquid is allowed to percolate through the coffee, which is usually contained in a basket or like part, and the object of my invention is to provide a device for making coffee for drinking purposes that shall be extremely pure and free from injurious ingredients; and a further object of the invention is to provide a device in which the coffee may be quickly prepared and one which shall not require extreme care to insure its successful operation.

A form of device in the use of which these objects may be attained is illustrated in the accompanying drawings, in which—

Figure 1 is a view in vertical section through a coffee pot embodying my invention. Fig. 2 is a detail view showing a modified construction of heating plate. Fig. 3 is a detail view showing a modified form of the invention. Fig. 4 is a detail view on enlarged scale illustrating the form of the mixer.

In the accompanying drawings the numeral 5 denotes the receptacle or pot which may be constructed in any desired form and of proper material and having a handle 6, top 7, and spout 8.

A heating base or foot 9 is secured to the bottom of the pot. This foot may be of any desired form and composed of any desired material and of such size as to properly perform the work required of it. In the form shown this foot is round and slightly smaller than the bottom of the pot. This base or foot serves as a conductor for the heat to the liquid within the tube, in the form of device herein shown a portion of the heat being conducted by the lower end of a central tube to be hereinafter described, although the form of connection of tube and base herein shown is not absolutely essential to the embodiment of my invention. It is joined to the pot as by a neck 10, thus leaving a space 11 between the bottom of the pot and the greater portion of the upper surface of the foot. The neck 10 projects through an opening in the bottom of the pot to the interior thereof and is threaded for the reception of a nut 13 located within the pot and by means of which the base is held securely in place. Washers 14—15, one located without and the other within the pot and closely surrounding the neck, are employed to partially insulate the body of the pot from the heat of the plate or foot, and also to pack the opening in the bottom of the pot through which the neck extends.

The plate 9 has a chamber 16 into which a central tube 17 extends, the tube being secured to the base as by means of interengaging screw-threaded parts. This tube has ports 18—19 opening through its side walls, one set toward the bottom of the tube and the other set nearer the top.

A jacket 20 surrounds this inner or central tube, providing a chamber 21. Ports 22 extend through the wall of the jacket near the bottom opening underneath a hood 23 secured to the jacket and having a mouth 24 at its lower end.

A basket 25 is supported by the tube 17 and a cap 26 on the upper end of the tube may direct the flow of fluid onto the coffee held in the basket 25.

It has been demonstrated that in the method of preparing coffee where the ground coffee is subjected to the action of boiling water, injurious ingredients are extracted from the coffee. By the use of the device above described boiling water is prevented from coming in contact with the coffee held in the basket 25. The water within the pot 5 is not heated to the boiling point, but the water within the tube and in the chamber 16 in the foot 9 is heated to such point. As the force generated by this heated liquid causes an upward flow through the tube, the cooler liquid from the pot 5 is also drawn in through the ports 22—18 and 19 and carried upward, the hotter liquid being tempered so that when it is ejected at the top of the tube it is not of a temperature to injure the coffee within the basket, or extract injurious ingredients therefrom.

The hood 23 prevents the force within the tube 17 from ejecting the liquid through the ports 18 and 22, which occurs under some conditions, as when the liquid is comparatively shallow within the pot.

It has been demonstrated by experiment that when excessive heat is applied to the foot or base 9, with the pot in a vertical position, the liquid will not be forced upward through the inner tube. This will not occur under ordinary conditions, but in order to guard against careless use of the pot and the subjecting of the plate to an over amount of heat I introduce a mixer 27 at the bottom of the tube 7 or within the chamber 16. This mixer is preferably tubular in form with a reduced opening 28 at the top and a flange 29 having radial grooves 30 at the bottom. By the use of this mixer the device will operate under any condition of heat which may be applied to the base.

While I prefer to form the chamber 16 partially through the base 9 and secure the tube 17 therein, other forms of heating chamber may be provided. As shown in Fig. 2 the base 31 has an opening 32 extended entirely through it and the tube 33 is closed at the bottom as at 34. The results, however, in operation are practically the same as those hereinbefore noted.

The construction above described is found to produce good results with a considerable amount of liquid within the pot. If, however, it shall be desired to use a small quantity of liquid within the pot a construction as shown in Fig. 3 of the drawings may be employed. In this construction the inner tube 40 is contracted as at 41 producing a smaller channel 42 extending to the top of the tube. The outer tube 43 is also contracted at or near the same point, the upper part of the chamber between the tubes being thus reduced in size, as at 44.

What I claim as my invention and desire to secure by Letters Patent is:—

1. A receptacle, a tube extending upward therein, a basket located on said tube near its upper end, said tube having openings through its wall above and below said basket, a jacket surrounding said tube and having an opening through its wall near the lower end thereof, and a conductor for conveying heat to liquid within said tube.

2. A receptacle, a tube extending upward therein, a basket located on the tube near its upper end, said tube having openings through its wall above and below said basket, a jacket surrounding said tube and having an opening through its wall, a hood surrounding the opening in the jacket, and a conductor for conveying heat to liquid within said tube.

3. A receptacle, a tube projecting upward therein, a basket located on the tube near its upper end, said tube having openings through its wall above and below said basket, a jacket extending from a point near the bottom of the tube to a point near said basket and closed at its ends and having an opening through its wall near the lower end, and a conductor for conveying heat to liquid within said tube.

4. A receptacle, a tube extending upward therein, a basket located on the tube near its upper end, said tube having openings through its wall above and below the basket, a jacket extending from a point near the lower end of the tube upward to a point near said basket and closed at both ends and having an opening near its lower end but above the lower opening in said tube, a hood secured to the jacket and surrounding the opening therein, and a conductor for conveying heat to liquid within the tube.

5. A receptacle, a heating plate secured to the bottom of the receptacle and having a chamber therein, a tube secured to the heating plate and projecting from said chamber upward within the receptacle, a basket located on the tube near its upper end, said tube having openings through its wall above and below said basket, and a jacket surrounding said tube and having an opening through its wall.

6. A receptacle, a heating plate secured to the bottom of the receptacle and having a chamber therein, a tube projecting from said chamber upward within the receptacle, a basket located on the tube near its upper end, said tube having openings above and below said basket, a jacket surrounding said tube and having an opening through its wall, and a hood surrounding said opening.

7. A receptacle, a heating plate removably secured to the bottom of the receptacle and having a chamber, a tube projecting upward from said heating plate and within the receptacle, a basket located on the tube near its upper end, said tube having openings above and below said basket, and a jacket surrounding said tube and having an opening through its wall.

8. A receptacle, a heating plate removably secured to the bottom thereof and having a chamber, a tube projecting upward from said chamber within the receptacle and removably secured to said plate, a basket located near the upper end of the tube, said tube having openings through its wall above and below said basket, and a jacket surrounding said tube and having an opening through its wall.

9. A receptacle, a tube extending upward within the receptacle and reduced in size at its upper end, a basket located on the tube near its upper end, said tube having openings through its wall above and below said basket, a jacket surrounding said tube and having an opening through its wall, and a conductor for conveying heat to liquid within said tube.

10. A receptacle, a tube extending upward therein and contracted at its upper end, a basket located on the tube near its upper end, said tube having openings through its wall above and below said basket, a jacket contracted at its upper end and surrounding said tube and having an opening through its wall, and a conductor for conveying heat to liquid within the tube.

11. A receptacle, a tube extending upward therein, a basket located on the tube near its upper end, said tube having an outlet opening above and an inlet opening underneath said basket, a jacket surrounding said tube and having an opening through its wall into the chamber between the two tubes, and a conductor for conveying heat to liquid within the tube.

12. A receptacle, a tube extending upward therein and having an inlet opening and an outlet opening, a jacket surrounding said tube and having an opening through its wall into the chamber between the two tubes, a conductor for conveying heat to liquid within one of said tubes, and a basket located near the upper end of said tubes.

13. A receptacle, a tube extending upward therein and having an inlet and an outlet opening, a conductor for conveying heat to liquid within said tube, a basket located on the tube near its upper end, and a mixer consisting of a part loosely resting at the bottom of the tube.

14. A receptacle, a tube extending upward within the receptacle and having an inlet and an outlet opening, a conductor for conveying heat to liquid within said tube, a basket located on the tube near its upper end, and a mixer consisting of a tubular part loosely resting at the bottom of the tube.

15. A receptacle, a tube extending upward therein and having an inlet and an outlet opening, a conductor for conveying heat to liquid within the tube, a basket located near the upper end of the tube, and a mixer consisting of a tubular part loosely resting at the bottom of the tube and having grooves in its bottom for the entrance of liquid.

JOHN F. IVES.

Witnesses:
ARTHUR B. JENKINS,
ALBERT C. BILL.